(12) United States Patent
Natsui et al.

(10) Patent No.: US 9,979,012 B2
(45) Date of Patent: May 22, 2018

(54) LITHIUM ION SECONDARY BATTERY AND METHOD FOR MANUFACTURING THE SAME

(71) Applicant: Panasonic Corporation, Osaka (JP)

(72) Inventors: Ryuichi Natsui, Osaka (JP); Kensuke Nakura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 783 days.

(21) Appl. No.: 14/449,879

(22) Filed: Aug. 1, 2014

(65) Prior Publication Data

US 2015/0064577 A1    Mar. 5, 2015

(30) Foreign Application Priority Data

Sep. 2, 2013   (JP) .................. 2013-181480

(51) Int. Cl.
*H01M 4/36*   (2006.01)
*H01M 4/48*   (2010.01)
(Continued)

(52) U.S. Cl.
CPC ........... *H01M 4/364* (2013.01); *H01M 4/485* (2013.01); *H01M 4/505* (2013.01); *H01M 10/058* (2013.01); *H01M 10/0525* (2013.01); *H01M 10/0569* (2013.01); *H01M 2004/028* (2013.01); *H01M 2220/20* (2013.01); *H01M 2220/30* (2013.01); *H01M 2300/0034* (2013.01);
(Continued)

(58) Field of Classification Search
CPC ...... H01M 4/364; H01M 4/485; H01M 4/505; H01M 10/0569; H01M 10/058; H01M 2220/20; H01M 2004/028; H01M 2300/034; H01M 2220/30
See application file for complete search history.

(56) References Cited

U.S. PATENT DOCUMENTS 6,346,348 B1 *   2/2002   Nakajima ............. H01M 4/485
                                                           429/231.1
9,059,462 B2 *   6/2015   Park ...................... H01M 4/485
(Continued)

FOREIGN PATENT DOCUMENTS

JP   2006-185794   7/2006
JP   2007-066745   3/2007

*Primary Examiner* — Jonathan Crepeau
*Assistant Examiner* — Angela Martin
(74) *Attorney, Agent, or Firm* — McDermott Will & Emery LLP

(57) ABSTRACT

A lithium ion secondary battery includes a positive electrode; a negative electrode; a separator disposed between the positive electrode and the negative electrode; and a non-aqueous electrolyte, wherein the positive electrode contains, as a positive electrode active material, a lithium-containing transition metal compound that belongs to space group Fd3-m and that contains lithium and transition metal M (M represents Mo, or Mo and at least one selected from the group consisting of Mn, Co, Ni, W, and V), a molar ratio of the lithium to the transition metal M is 2.7 or more and 3.3 or less, and a ratio of a mass of the lithium-containing transition metal compound to a total mass of the positive electrode active material in the positive electrode is 0.8 or more.

19 Claims, 4 Drawing Sheets

(51) Int. Cl.
*H01M 4/50* (2010.01)
*H01M 10/05* (2010.01)
*H01M 4/485* (2010.01)
*H01M 10/0569* (2010.01)
*H01M 4/505* (2010.01)
*H01M 10/0525* (2010.01)
*H01M 10/058* (2010.01)
*H01M 4/02* (2006.01)

(52) U.S. Cl.
CPC .............. *Y02E 60/122* (2013.01); *Y02P 70/54* (2015.11); *Y02T 10/7011* (2013.01); *Y10T 29/49108* (2015.01)

(56) References Cited

U.S. PATENT DOCUMENTS

2007/0141470 A1* 6/2007 Nakura ................. H01M 4/131
 429/231.3
2013/0130105 A1* 5/2013 Choi .................... H01M 4/131
 429/211

* cited by examiner

LITHIUM ION SECONDARY BATTERY AND METHOD FOR MANUFACTURING THE SAME

BACKGROUND

1. Field

The present disclosure relates to a lithium ion secondary battery and a method for manufacturing the lithium ion secondary battery.

2. Description of the Related Art

Lithium ion secondary batteries have a high capacity and a high energy density and reduction in their size and weight is easily achieved. Lithium ion secondary batteries are widely used as power sources for mobile small-sized electronic devices, electric vehicles, and the like. The demand for lithium ion secondary batteries has been increasing year after year.

An important technical challenge in the development of lithium ion secondary batteries is increasing their capacity. Positive electrode materials that have been used to date are lithium-containing transition metal compounds represented by $Li_xMeO_2$ (Me represents at least one selected from the group consisting of Co, Ni, Mn, and Al). For the purpose of increasing the capacity of $Li_xMeO_2$, for example, studies are being conducted in which the charging voltage is increased and the surface structure is optimized (Japanese Unexamined Patent Application Publication Nos. 2006-185794 and 2007-66745). However, the amount by which the capacity of $Li_xMeO_2$ can be increased in these studies is reaching the saturation point.

SUMMARY

Accordingly, it is an object of the present disclosure to provide a technique for increasing the capacity of a lithium ion secondary battery.

The present disclosure provides a lithium ion secondary battery including a positive electrode; a negative electrode; a separator disposed between the positive electrode and the negative electrode; and a non-aqueous electrolyte, wherein the positive electrode contains, as a positive electrode active material, a lithium-containing transition metal compound that belongs to space group Fd3-m and that contains lithium and transition metal M (M represents Mo, or Mo and at least one selected from the group consisting of Mn, Co, Ni, W, and V), a molar ratio of the lithium to the transition metal M is 2.7 or more and 3.3 or less, and a ratio of a mass of the lithium-containing transition metal compound to a total mass of the positive electrode active material in the positive electrode is 0.8 or more.

The above-described technique can provide a lithium ion secondary battery having a high capacity.

DESCRIPTION OF EMBODIMENTS

Figure 1:
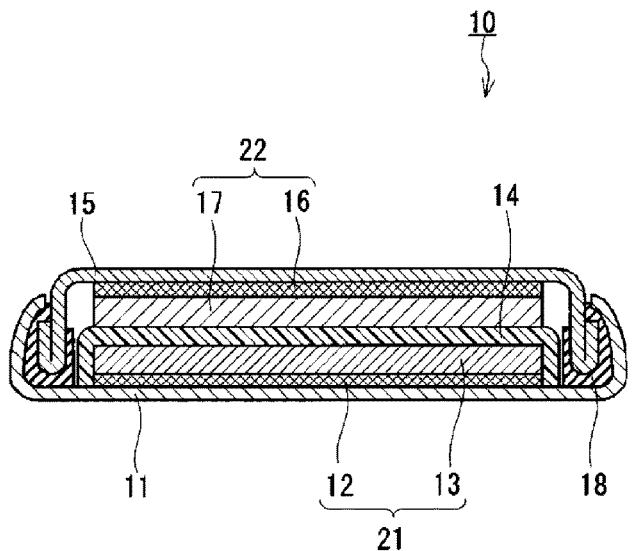
FIG. 1 is a schematic cross-sectional view of a lithium ion secondary battery according to an embodiment of the present disclosure.

The present disclosers performed thorough studies. As a result, they have found that use of a positive electrode active material in which multi-electron participates in a charge/discharge reaction can provide a lithium ion secondary battery having a high capacity.

A lithium ion secondary battery according to an embodiment of the present disclosure includes a positive electrode; a negative electrode; a separator disposed between the positive electrode and the negative electrode; and a non-aqueous electrolyte, wherein the positive electrode contains, as a positive electrode active material, a lithium-containing transition metal compound that belongs to space group Fd3-m and that contains lithium and transition metal M (M represents Mo, or Mo and at least one selected from the group consisting of Mn, Co, Ni, W, and V), a molar ratio of the lithium to the transition metal M is 2.7 or more and 3.3 or less, and a ratio of a mass of the lithium-containing transition metal compound to a total mass of the positive electrode active material in the positive electrode is 0.8 or more.

In the case where the lithium-containing transition metal compound is used as the positive electrode active material, multi-electron participates in a charge/discharge reaction. Accordingly, a lithium ion secondary battery having a high capacity can be provided.

The lithium-containing transition metal compound may be $Li_\alpha M_\beta O_\gamma$ ($2.7\beta \le \alpha \le 3.3\beta$, $1.8 \le \beta \le 2.2$, $6.4 \le \gamma \le 7.6$).

In the case where $Li_\alpha M_\beta O_\gamma$ ($2.7\beta \le \alpha \le 3.3\beta$, $1.8 \le \beta \le 2.2$, $6.4 \le \gamma \le 7.6$) is used as the positive electrode active material, multi-electron participates in a charge/discharge reaction. Accordingly, a lithium ion secondary battery having a high capacity can be provided.

The lithium-containing transition metal compound may be $Li_6M_2O_7$.

In the case where $Li_6Mo_2O_7$ is used as the positive electrode active material, multi-electron participates in a charge/discharge reaction. Accordingly, a lithium ion secondary battery having a high capacity can be provided.

The lithium-containing transition metal compound may be $Li_\alpha Mo_{\beta-x}Me_xO_\gamma$ ($0 \le x \le 1.5$, Me represents at least one selected from the group consisting of Mn, Co, Ni, W, and V). The positive electrode active material may be $Li_6Mo_{2-x}Me_xO_7$ ($0 \le x \le 1.5$). Even in the case where the transition metal M is substituted by another element, a lithium ion secondary battery having a high capacity can be provided.

The positive electrode may contain, in addition to the lithium-containing transition metal compound, at least one other positive electrode active material.

The at least one other positive electrode active material may be an additional lithium-containing transition metal compound which lithium ions is capable of being inserted into and being released from reversibly.

The additional lithium-containing transition metal compound contains at least one selected from $Li_2MeO_3$, $LiMeO_2$, $Li_4MeO_5$, $Li_2MeO_4$, and $LiMe_2O_4$ (Me represents at least one selected from the group consisting of Mo, Mn, Co, Ni, Fe, W, Cr, and V).

These substances can be suitably used as a positive electrode active material of the battery.

Even after charge/discharge reactions, the lithium-containing transition metal compound may still belong to space group Fd3-m. During the initial discharge, lithium is occluded at the 16c site and the 16d site and also at the 8a site. That is, a three-electron reaction occurs. Based on this three-electron reaction, the battery has a high capacity.

The non-aqueous electrolyte may contain at least one fluorine solvent selected from the group consisting of fluoroethylene carbonate, methyl fluoropropionate, fluorobenzene, fluoroethyl methyl carbonate, and fluorodimethylene carbonate. In the case where the non-aqueous electrolytic solution contains such a fluorine solvent, the non-aqueous electrolytic solution has enhanced resistance against oxidation. As a result, even in the case where the battery is charged at a high voltage, stable operation of the battery can be achieved.

A method for manufacturing a lithium ion secondary battery according to an embodiment of the present disclosure includes a step of preparing a positive electrode, a negative electrode containing lithium, and a separator; and a step of assembling the positive electrode, the separator, and the negative electrode such that the separator is disposed between the positive electrode and the negative electrode, wherein the positive electrode contains, as a positive electrode active material, a lithium-containing transition metal compound that belongs to space group Fd3-m and that contains lithium and transition metal M (M represents Mo, or Mo and at least one selected from the group consisting of Mn, Co, Ni, W, and V), a molar ratio of the lithium to the transition metal M is 2.7 or more and 3.3 or less, a ratio of a mass of the lithium-containing transition metal compound to a total positive electrode active material mass in the positive electrode is 0.8 or more.

In the initial charging process performed after the assembly of the battery, $Li_6Mo_2O_7$ is turned into $Li_2Mo_2O_7$; and, in the initial discharging process, $Li_2Mo_2O_7$ is turned into $Li_6Mo_2O_7$. During the initial discharge, lithium is occluded at the 16c site and the 16d site and also at the 8a site. In order to cause such a reaction, a negative electrode is prepared that contains, in advance, lithium that is to participate in charge/discharge reactions. As a result, a lithium ion secondary battery having a high capacity can be provided.

The lithium-containing transition metal compound may be $Li_\alpha M_\beta O_\gamma$ ($2.7\beta \le \alpha \le 3.3\beta$, $1.8 \le \beta \le 2.2$, $6.4 \le \gamma \le 7.6$).

The lithium-containing transition metal compound may be $Li_6M_2O_7$.

The lithium-containing transition metal compound may be $Li_\alpha Mo_{\beta-x} Me_x O_\gamma$ ($0 \le x \le 1.5$, Me represents at least one selected from the group consisting of Mn, Co, Ni, W, and V). The positive electrode active material may be $Li_6 Mo_{2-x} Me_x O_7$ ($0 \le x \le 1.5$).

Hereinafter, embodiments according to the present disclosure will be described with reference to the drawings. However, the present disclosure is not limited to the following embodiments.

Referring to FIG. 1, a coin-type battery 10 according to an embodiment includes a positive electrode 21, a negative electrode 22, and a separator 14. The separator 14 is disposed between the positive electrode 21 and the negative electrode 22. The positive electrode 21, the negative electrode 22, and the separator 14 are impregnated with a non-aqueous electrolyte (non-aqueous electrolytic solution). The battery 10 further includes a case 11, a sealing plate 15, and a gasket 18. The positive electrode 21, the negative electrode 22, and the separator 14 form an electrode assembly. The electrode assembly is contained within the case 11. The case 11 is sealed with the gasket 18 and the sealing plate 15.

The positive electrode 21 includes a positive electrode current collector 12 and a positive electrode active material layer 13 disposed on the positive electrode current collector 12. For example, the positive electrode current collector 12 is formed of a metal material such as aluminum, stainless steel, or aluminum alloy. Alternatively, the positive electrode current collector 12 may be omitted and the case 11 may be used as a positive electrode current collector. The positive electrode active material layer 13 at least contains $Li_6Mo_2O_7$ as a positive electrode active material. If necessary, the positive electrode active material layer 13 may contain additives such as a conductive agent, an ion conductive auxiliary agent, and a binder.

The positive electrode active material contained in the positive electrode active material layer 13 may substantially contain only a lithium-containing transition metal compound that belongs to space group Fd3-m and that contains lithium and transition metal M such that a molar ratio of the lithium to the transition metal M is 2.7 or more and 3.3 or less (former case). Alternatively, the positive electrode active material layer 13 may contain positive electrode active materials containing at least one other positive electrode active material in addition to the lithium-containing transition metal compound (latter case). In the former case, the phrase "substantially contain only a lithium-containing transition metal compound that belongs to space group Fd3-m and that contains lithium and transition metal M such that a molar ratio of the lithium to the transition metal M is 2.7 or more and 3.3 or less" means that active materials other than the lithium-containing transition metal compound are not deliberately added to the positive electrode active material layer 13. Stated another way, relative to the total positive-electrode-active-material mass, the ratio of the mass of the lithium-containing transition metal compound that belongs to space group Fd3-m and that contains lithium and transition metal M such that a molar ratio of the lithium to the transition metal M is 2.7 or more and 3.3 or less, is more than 0.98. In the latter case, relative to the total positive-electrode-active-material mass, the ratio of the mass of the lithium-containing transition metal compound that belongs to space group Fd3-m and that contains lithium and transition metal M such that a molar ratio of the lithium to the transition metal M is 2.7 or more and 3.3 or less, is more than 0.80.

The positive electrode active material contained in the positive electrode may be substantially $Li_6Mo_2O_7$ alone (former case). Alternatively, the positive electrode active material layer 13 may contain positive electrode active materials containing at least one other positive electrode active material in addition to $Li_6Mo_2O_7$ (latter case). In the former case, the phrase "The positive electrode active material contained in the positive electrode may be substantially $Li_6Mo_2O_7$ alone" means that active materials other than $Li_6Mo_2O_7$ are not deliberately added to the positive electrode active material layer 13. Stated another way, the ratio of the mass of $Li_6Mo_2O_7$ to the total mass of $Li_6Mo_2O_7$ and one or more positive electrode active materials unavoidably contained in the positive electrode 21 is more than 0.98. In the latter case, $Li_6Mo_2O_7$ is the main component of the positive electrode active materials. The auxiliary components of the positive electrode active materials are not particularly limited and substances that contribute to charge/discharge reactions can be used as the auxiliary components. For example, the ratio of the mass of $Li_6Mo_2O_7$ to the total mass of all the positive electrode active materials contained in the positive electrode active material layer 13 is 0.8 or more. The upper limit of this ratio of $Li_6Mo_2O_7$ is not particularly limited. From the standpoint of differentiating the latter case from the former case, the upper limit of the ratio of $Li_6Mo_2O_7$ is, for example, 0.98. By increasing the content ratio of $Li_6Mo_2O_7$ in the positive electrode active material layer 13, a sufficiently high capacity can be ensured in the battery 10.

In addition to $Li_6Mo_2O_7$ or the lithium-containing transition metal compound that belongs to space group Fd3-m and that contains lithium and transition metal M such that a molar ratio of the lithium to the transition metal M is 2.7 or more and 3.3 or less, there is another positive electrode active material that is, for example, a lithium-containing transition metal compound that undergoes reversible intercalation and deintercalation of lithium. This lithium-containing transition metal compound may be at least one selected from the group consisting of $Li_2MeO_3$, $LiMeO_2$, $Li_4MeO_5$, $Li_2MeO_4$, and $LiMe_2O_4$ (Me is at least one selected from the group consisting of Mo, Mn, Co, Ni, Fe, W, Cr, and V). Examples of such a positive electrode active material that is not $Li_6Mo_2O_7$ include $LiMoO_2$, $Li_2MoO_3$, $Li_4MoO_5$, $Li_2MnO_3$, $LiMn_2O_4$, $Li(Ni, Co, Mn)O_2$, $Li_5FeO_4$, $Li_6MnO_4$, $Li_6CoO_4$, $Li_{1.2}(Mn, Co, Ni)O_2$, $LiCrO_2$, and $LiWO_2$. These substances can be suitably used as positive electrode active materials of the battery 10.

$Li_5FeO_4$, $Li_6MnO_4$, and $Li_6CoO_4$ exhibit a low initial charge/discharge efficiency (the initial charge capacity is higher than the initial discharge capacity). Accordingly, at least one selected from the group consisting of $Li_5FeO_4$, $Li_6MnO_4$, and $Li_6CoO_4$ may be mixed, in an optimal ratio, with $Li_6Mo_2O_7$, which exhibits an initial charge capacity lower than an initial discharge capacity, so that the initial charge/discharge efficiency can be made close to 100%.

Even after the lithium-containing transition metal compound that belongs to space group Fd3-m and that contains lithium and transition metal M such that a molar ratio of the lithium to the transition metal M is 2.7 or more and 3.3 or less is subjected to charge/discharge reactions, it still belongs to space group Fd3-m. Similarly, even after $Li_6Mo_2O_7$, which is one of such lithium-containing transition metal compounds, is subjected to charge/discharge reactions, it still belongs to space group Fd3-m. Specifically, in the initial charging process performed after the assembly of the battery 10, $Li_6Mo_2O_7$ is turned into $Li_2Mo_2O_7$; and, in the initial discharging process, $Li_2Mo_2O_7$ is turned into $Li_6Mo_2O_7$. During the initial discharge, lithium is occluded at the 16c site and the 16d site and also at the 8a site. That is, a three-electron reaction occurs. Based on this three-electron reaction, the battery 10 has a high capacity.

Regarding $Li_6Mo_2O_7$ or the lithium-containing transition metal compound that belongs to space group Fd3-m and that contains lithium and transition metal M such that a molar ratio of the lithium to the transition metal M is 2.7 or more and 3.3 or less, the primary particles have an average particle size in the range of, for example, 50 nm to 5 µm (or 50 nm to 500 nm). When the average particle size is appropriately adjusted, the side reaction between the positive electrode active material and the electrolytic solution can be suppressed. In addition, a good rate characteristic is exhibited. In the case where the main component of the positive electrode active material is $Li_6Mo_2O_7$, the average particle size of $Li_6Mo_2O_7$ particles can be calculated in the following manner. $Li_6Mo_2O_7$ particles are observed with an electron microscope (SEM). In the obtained image, the square root of area S of a $Li_6Mo_2O_7$ particle is defined as particle size a of the $Li_6Mo_2O_7$ particle ($a=S^{1/2}$). In this way, the particle sizes a of 50 $Li_6Mo_2O_7$ particles are calculated. The average value of the calculated particle sizes a is defined as the average particle size of primary particles of $Li_6Mo_2O_7$. As described below, $Li_6Mo_2O_7$ was substantially obtained as a single-phase compound this time and hence the calculated (average) particle size is probably the particle size of $Li_6Mo_2O_7$ particles. In the case where it is difficult to isolate $Li_6Mo_2O_7$ from the final product obtained in the $Li_6Mo_2O_7$ manufacturing step, particles containing $Li_6Mo_2O_7$ and unavoidable impurities can be regarded as $Li_6Mo_2O_7$ particles.

In order to impart a good electronic conductive property to positive electrode active material particles, the particles of the positive electrode active material (for example, $Li_6Mo_2O_7$) may be combined with an appropriate conductive agent (for example, carbon). Specifically, the surfaces of $Li_6Mo_2O_7$ particles may be partially covered with the conductive agent.

Particles of $Li_6Mo_2O_7$, which is an example of the lithium-containing transition metal compound that belongs to space group Fd3-m and that contains lithium and transition metal M such that a molar ratio of the lithium to the transition metal M is 2.7 or more and 3.3 or less, may be produced by, for example, the following method. Particles of a lithium compound are mixed with particles of a molybdenum compound to provide a raw material mixture. Examples of the lithium compound include lithium hydroxide, lithium carbonate, and lithium oxide. Examples of the molybdenum compound include various molybdenum oxides and ammonium molybdate. The step of mixing particles of a lithium compound with particles of a molybdenum compound may be performed by a dry method or a wet method. In the mixing step, a mixing device such as a ball mill may be used. The obtained raw material mixture is subjected to sinter to provide $Li_6Mo_2O_7$. The sinter step is performed, for example, in an inert atmosphere such as nitrogen atmosphere or argon atmosphere. The sinter step is performed, for example, under conditions at a temperature of 500° C. to 900° C. and for 12 to 24 hours. By optimizing, for example, conditions of the mixing step and conditions of the sinter step, active material particles substantially containing $Li_6Mo_2O_7$ alone can be obtained.

Alternatively, instead of $Li_6Mo_2O_7$ or together with $Li_6Mo_2O_7$, a compound in which Mo in $Li_6Mo_2O_7$ is partially substituted by another metal element may be used as a positive electrode active material. Such a compound is represented by $Li_6Mo_{2-x}Me_xO_7$ ($0<x<2$ or $0.1≤x≤1.5$). Me represents at least one selected from the group consisting of Mn, Co, Ni, W, and V. By partially substituting Mo in $Li_6Mo_2O_7$ by another metal element, various characteristics such as cycle characteristics may be improved. $Li_6Mo_2O_7$ corresponds to $Li_6Mo_{2-x}Me_xO_7$ ($x=0$). That is, x is 0 or more.

The negative electrode 22 includes a negative electrode current collector 16 and a negative electrode active material layer 17 disposed on the negative electrode current collector 16. For example, the negative electrode current collector 16 is formed of a metal material such as aluminum, stainless steel, or aluminum alloy. Alternatively, the negative electrode current collector 16 may be omitted and the sealing plate 15 may be used as a negative electrode current collector. The negative electrode active material layer 17 contains a negative electrode active material. If necessary, the negative electrode active material layer 17 may contain additives such as a conductive agent, an ion conductive auxiliary agent, and a binder.

The negative electrode active material may be a metal material, a carbon material, an oxide, a nitride, a tin compound, a silicon compound, or the like. The metal material may be an elemental metal or an alloy. Examples of the metal material include lithium metal and lithium alloys. Examples of the carbon material include natural graphite, coke, graphitizing carbon material, carbon fiber, spherical carbon, artificial graphite, and non-crystalline carbon. From the standpoint of capacity density, silicon (Si), tin (Sn), a silicon compound, or a tin compound is suitably used. The silicon compound and the tin compound may be alloys or solid solutions. Examples of the silicon compound include $SiO_x$ ($0.05<x<1.95$). A compound (alloy or solid solution) obtained by partially substituting silicon in $SiO_x$ by another element may also be used. The other element is at least one selected from the group consisting of boron, magnesium, nickel, titanium, molybdenum, cobalt, calcium, chromium, copper, iron, manganese, niobium, tantalum, vanadium, tungsten, zinc, carbon, nitrogen, and tin. Examples of the tin compound include $Ni_2Sn_4$, $Mg_2Sn$, $SnO_x$ ($0<x<2$), $SnO_2$, and $SnSiO_2$. A single tin compound selected from these examples may be used alone or two or more tin compounds selected from these examples may be used in combination.

The shape of the negative electrode active material is not particularly limited. A negative electrode active material having a publicly known shape such as a particulate shape or a fibrous shape may be used.

In the case where a material not containing lithium is used as the negative electrode active material, lithium in an amount beyond irreversible capacity of the negative electrode 22 is desirably supplemented to the negative electrode 22 (negative electrode active material layer 17) in advance. That is, in manufacturing of the battery 10, the negative electrode 22 prepared is desirably a negative electrode containing, in advance, lithium that is to participate in charge/discharge reactions. In the initial charging process performed after the assembly of the battery 10, $Li_6Mo_2O_7$ is turned into $Li_2Mo_2O_7$; and, in the initial discharging process, $Li_2Mo_2O_7$ is turned into $Li_6Mo_2O_7$. During the initial discharge, lithium is occluded at the 16c site and the 16d site and also at the 8a site. In order to cause such a reaction, the negative electrode 22 containing, in advance, lithium that is to participate in charge/discharge reactions is prepared. As a result, the battery 10 having a high capacity can be provided.

A method used to supplement lithium to the negative electrode active material layer 17 (to make the negative electrode active material layer 17 occlude lithium) is not particularly limited. Specifically, there are a method (a) of depositing lithium on the negative electrode active material layer 17 by a vapor phase method such as vacuum vapor deposition and a method (b) of bringing a lithium metal foil into contact with the negative electrode active material layer 17 and heating these foil and layer. In both of these methods, heating can be used to diffuse lithium into the negative electrode active material layer 17. In addition, there is a method of electrochemically making the negative electrode active material layer 17 occlude lithium. Specifically, the negative electrode 22 not containing lithium and a lithium metal foil (positive electrode) are assembled into a battery and this battery is charged such that the negative electrode 22 occludes lithium.

Examples of the binder for the positive electrode 21 and the negative electrode 22 include polyvinylidene fluoride, polytetrafluoroethylene, polyethylene, polypropylene, aramid resin, polyamide, polyimide, polyamide-imide, polyacrylonitrile, polyacrylic acid, polyacrylic acid methylester, polyacrylic acid ethylester, polyacrylic acid hexylester, polymethacrylic acid, polymethacrylic acid methylester, polymethacrylic acid ethylester, polymethacrylic acid hexylester, polyvinyl acetate, polyvinylpyrrolidone, polyether, polyethersulfone, hexafluoropolypropylene, styrene-butadiene rubber, and carboxymethyl cellulose. The binder may be a copolymer of two or more materials selected from the group consisting of tetrafluoroethylene, hexafluoroethylene, hexafluoropropylene, perfluoroalkylvinylether, vinylidene fluoride, chlorotrifluoroethylene, ethylene, propylene, pentafluoropropylene, fluoromethylvinylether, acrylic acid, and hexadiene. The binder may be a mixture of two or more materials selected from the above-described materials.

Examples of the conductive agent for the positive electrode 21 and the negative electrode 22 include graphite, carbon black, electroconductive fibers, graphite fluoride, metal powder, conductive whiskers, conductive metal oxide, and organic electroconductive material. Examples of the graphite include natural graphite and artificial graphite. Examples of the carbon black include acetylene black, Ketjen black (registered trademark), channel black, furnace black, lamp black, and thermal black. An example of the metal powder is an aluminum powder. Examples of the conductive whiskers include zinc oxide whiskers and potassium titanate whiskers. An example of the conductive metal oxide is titanium oxide. Examples of the organic electroconductive material include phenylene derivatives.

The separator 14 can be formed of a material having a high ion permeability and a sufficiently high mechanical strength. Examples of the material include micro-porous films, woven fabrics, and nonwoven fabrics. Specifically, the separator 14 is desirably formed of a polyolefin such as polypropylene or polyethylene. The separator 14 formed of a polyolefin has high durability and can also exhibit a shutdown function upon exposure to excessive heat. The separator 14 has a thickness in the range of, for example, 10 to 300 μm (or 10 to 40 μm). The separator 14 may be a single-layer film formed of a single material or a composite film (or a multi-layer film) formed of two or more materials. The separator 14 has a porosity in the range of, for example, 30% to 70% (or 35% to 60%). The "porosity" means the ratio of the volume of pores to the entire volume of the separator 14 and is measured by, for example, a mercury press-in method.

The non-aqueous electrolytic solution contains a non-aqueous solvent and a lithium salt dissolved in the non-aqueous solvent. Examples of the non-aqueous solvent include cyclic carbonic acid ester solvents, chain carbonic acid ester solvents, cyclic ether solvents, chain ether solvents, cyclic ester solvents, chain ester solvents, and fluorine solvents. Examples of the cyclic carbonic acid ester solvents include ethylene carbonate, propylene carbonate, and butylene carbonate. Examples of the chain carbonic acid ester solvents include dimethyl carbonate, ethyl methyl carbonate, and diethyl carbonate. Examples of the cyclic ether solvents include tetrahydrofuran, 1,4-dioxane, and 1,3-dioxolane. Examples of the chain ether solvents include 1,2-dimethoxy ethane and 1,2-diethoxy ethane. An example of the cyclic ester solvents is γ-butyrolactone. An example of the chain ester solvents is methyl acetate. Examples of the fluorine solvents include fluoroethylene carbonate, methyl fluoropropionate, fluorobenzene, fluoroethyl methyl carbonate, and fluorodimethylene carbonate. A single non-aqueous solvent selected from the foregoing may be used alone or two or more non-aqueous solvents selected from the foregoing may be used in combination.

The non-aqueous electrolytic solution desirably contains at least one fluorine solvent selected from the group consisting of fluoroethylene carbonate, methyl fluoropropionate, fluorobenzene, fluoroethyl methyl carbonate, and fluorodimethylene carbonate. Non-aqueous electrolytic solutions containing such fluorine solvents have enhanced resistance against oxidation. Thus, even in the case where the battery 10 is charged at a high voltage, stable operation of the battery 10 can be achieved.

Examples of the lithium salt include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. A single lithium salt selected from the foregoing may be used alone or a mixture of two or more lithium salts selected from the foregoing may be used. The concentration of the lithium salt is in the range of, for example, 0.5 to 2 mol/l.

The present disclosure is not limited to coin-type lithium ion secondary batteries. The present disclosure is applicable to lithium ion secondary batteries having various shapes such as cylindrical-type batteries, prismatic-type batteries, sheet-type batteries, button-type batteries, flat-type batteries, and laminate-type batteries.

EXAMPLES

Example 1

Figure 2:
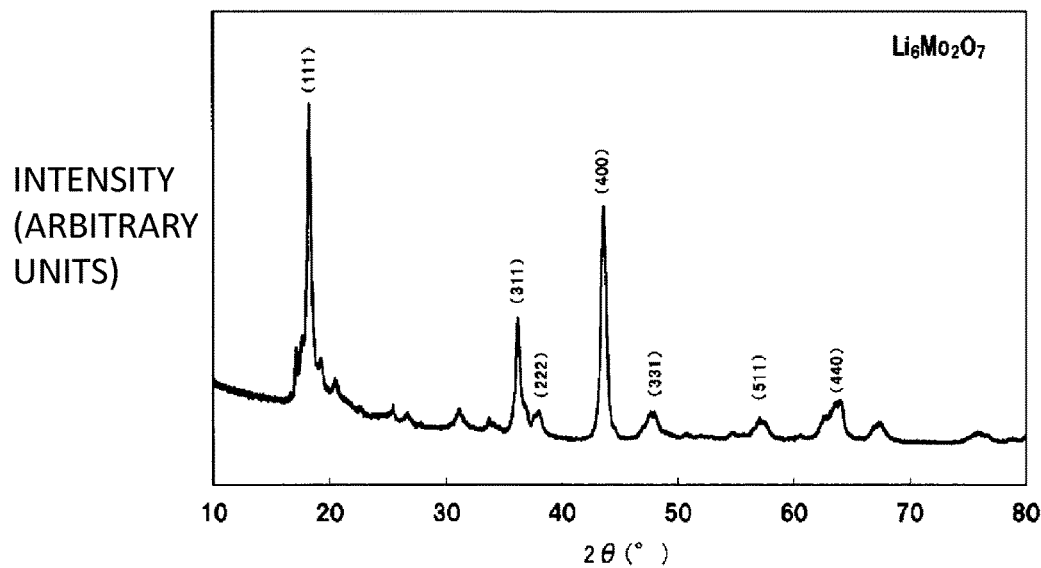
FIG. 2 illustrates an X-ray diffraction pattern of $Li_6Mo_2O_7$.

Particles of lithium oxide (manufactured by Kojundo Chemical Laboratory Co., Ltd.; $Li_2O$, purity: 99.9%) and particles of molybdenum oxide (manufactured by Kojundo Chemical Laboratory Co., Ltd.; $MoO_2$, purity: 99.9%) were subjected to wet milling and mixing with a ball mill to provide a raw material mixture in powder form. The raw material mixture was subjected to sinter under an argon gas stream at 800° C. to thereby provide active material particles. The active material particles were measured by X-ray powder diffractometry. The result is illustrated in FIG. 2. The X-ray diffraction pattern in FIG. 2 indicates that single-phase $Li_6Mo_2O_7$ was substantially obtained. The peaks are broad, which indicates low crystallinity. The X-ray diffraction data was analyzed by the Rietveld method to determine the composition of the active material particles. The active material particles contained $Li_6Mo_2O_7$, $Li_2MoO_3$, and $Li_4MoO_5$. The ratio of the mass of $Li_6Mo_2O_7$ to the mass of the active material particles was 0.95. The ratio of the mass of $Li_2MoO_3$ to the mass of the active material particles was 0.03. The ratio of the mass of $Li_4MoO_5$ to the mass of the active material particles was 0.02. The active material particles had an average particle size of about 200 nm. The molar ratio of Li to Mo (Li/Mo) varied within the range of 2.7 or more and 3.3 or less. However, all the active material particles belonged to space group Fd3-m. In addition, the initial discharge capacity of the battery described below was equivalent to that in the case of Li/Mo=3.

In the case where the active material was represented by $Li_\alpha M_\beta O_\gamma$, variations in β were observed approximately in the range of 1.8≤β≤2.2. Similarly, variations in the molar ratio of oxygen amount were observed within the range of about ±0.6. This is probably caused by the presence of an oxygen deficient state and an oxygen excessive state. However, even in the case where the molar ratio of oxygen varied, the active material belonged to space group Fd3-m and an initial discharge capacity equivalent to that of $Li_6Mo_2O_7$ was obtained. This probably indicates that the active material was $Li_\alpha M_\beta M_\beta O_\gamma$ (2.7β≤α≤3.3β, 1.8≤β≤2.2, 6.4≤γ≤7.6).

Subsequently, 70 parts by mass of the active material particles, 20 parts by mass of a conductive agent, 10 parts by mass of polyvinylidene fluoride (PVDF), and an appropriate amount of 2-methylpyrrolidone (NMP) were mixed to provide a positive electrode material mixture slurry. The positive electrode material mixture slurry was applied to a single surface of a positive electrode current collector formed of an aluminum foil having a thickness of 20 μm. The positive electrode material mixture slurry was dried and the foil was rolled so as to provide a 60-μm-thick positive electrode plate having a positive electrode active material layer. The positive electrode plate was blanked into a circular form having a diameter of 12.5 mm. Thus, a positive electrode was obtained.

A lithium metal foil having a thickness of 300 μm was blanked into a circular form having a diameter of 14.0 mm. Thus, a negative electrode was obtained.

Fluoroethylene carbonate (FEC), ethylene carbonate (EC), and ethyl methyl carbonate (EMC) were mixed with a volume ratio of 1:1:6 to provide a non-aqueous solvent. In this non-aqueous solvent, $LiPF_6$ was dissolved at a concentration of 1.0 mol/l to thereby provide a non-aqueous electrolytic solution.

The non-aqueous electrolytic solution was impregnated into a separator (manufactured by Celgard, LLC.; product No. 2320, thickness: 20 μm). A coin-type CR2032 battery was manufactured in a dry box controlled so as to have a dew point of −50° C. The Celgard (registered trademark) 2320 is a trilayer separator constituted by a polypropylene layer, a polyethylene layer, and a polypropylene layer.

Example 2

Figure 3:
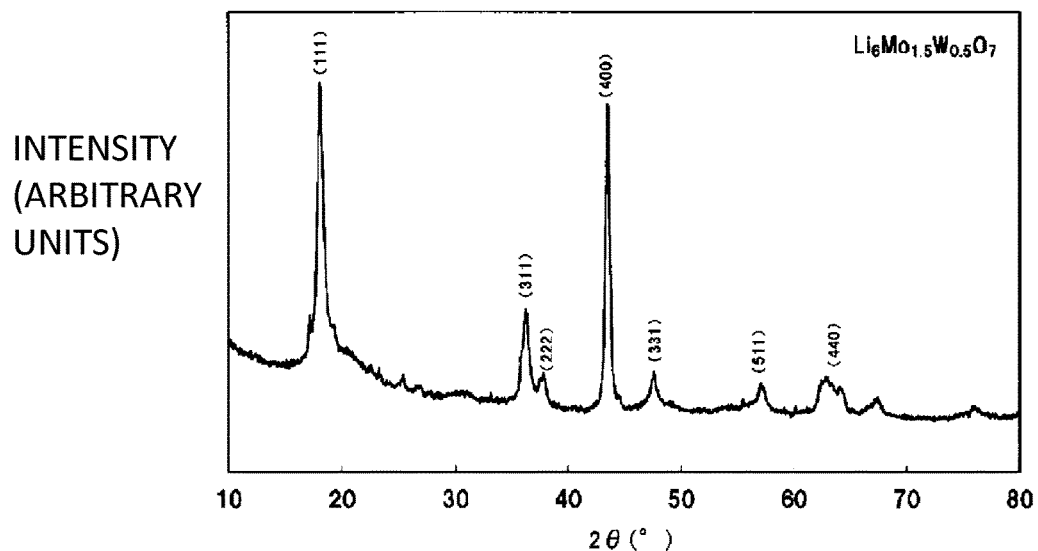
FIG. 3 illustrates an X-ray diffraction pattern of $Li_6Mo_{1.5}W_{0.5}O_7$.

Particles of lithium oxide (manufactured by Kojundo Chemical Laboratory Co., Ltd.; $Li_2O$, purity: 99.9%), particles of molybdenum oxide (manufactured by Kojundo Chemical Laboratory Co., Ltd.; $MoO_2$, purity: 99.9%), and particles of tungsten oxide (manufactured by Kojundo Chemical Laboratory Co., Ltd.; $WO_3$, purity: 99.9%) were subjected to wet milling and mixing with a ball mill to provide a raw material mixture in powder form. The raw material mixture was subjected to sinter under an argon gas stream at 800° C. to thereby provide active material particles. The active material particles were measured by X-ray powder diffractometry. The result is illustrated in FIG. 3. The X-ray diffraction pattern in FIG. 3 indicates that single-phase $Li_6Mo_{1.5}W_{0.5}O_7$ was substantially obtained. The peaks are broad, which indicates low crystallinity. The X-ray diffraction data was analyzed by the Rietveld method to determine the composition of the active material particles. The active material particles contained $Li_6Mo_{1.5}W_{0.5}O_7$, $Li_2MoO_3$, and $Li_5MoO_4$. The ratio of the mass of $Li_6Mo_{1.5}W_{0.5}O_7$ to the mass of the active material particles was 0.95. The ratio of the mass of $Li_2MoO_3$ to the mass of the active material particles was 0.03. The ratio of the mass of $Li_5MoO_4$ to the mass of the active material particles was 0.02. The active material particles were used to manufacture a coin-type battery in the same manner as in Example 1.

Example 3

Particles of lithium oxide (manufactured by Kojundo Chemical Laboratory Co., Ltd.; $Li_2O$, purity: 99.9%), particles of molybdenum oxide (manufactured by Kojundo Chemical Laboratory Co., Ltd.; $MoO_2$, purity: 99.9%), and $MnMoO_4$ sintered compact serving as a manganese source were subjected to wet milling and mixing with a ball mill to provide a raw material mixture in powder form. The raw material mixture was subjected to sinter under a nitrogen gas stream at 800° C. to thereby provide active material particles.

The $MnMoO_4$ sintered compact was obtained by subjecting MnO (Kojundo Chemical Laboratory Co., Ltd.; MnO, purity: 99.9%) and $MoO_3$ (Kojundo Chemical Laboratory Co., Ltd.; $MoO_3$, purity: 99.9%) to milling and mixing with a ball mill and by subsequently being subjected to sinter the mixture at 450° C. in the air atmosphere.

The active material particles produced above were subjected to ICP composition analysis. As a result, the Li/(Mn+ Mo) ratio was 3.

Figure 6:
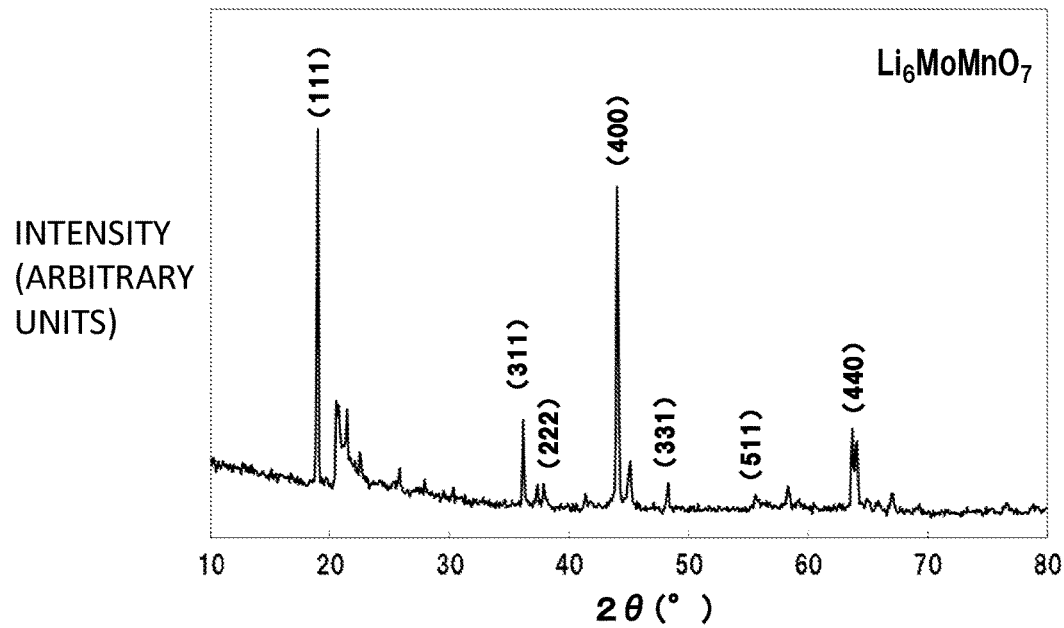
FIG. 6 illustrates an X-ray diffraction pattern of $Li_6MoMnO_7$.

The active material particles were also measured by X-ray powder diffractometry. The result is illustrated in FIG. 6. Compared with the active material particles obtained in Example 1, peak shifts were observed in the X-ray diffraction pattern in FIG. 6, which indicates that single-phase $Li_6MoMnO_7$ was substantially obtained.

The X-ray diffraction data was analyzed by the Rietveld method to determine the composition of the active material particles. The active material particles contained $Li_2MeO_3$, $LiMeO_2$, and $Li_4MoO_5$.

In this Example, the active material particles were used to manufacture a coin-type battery in the same manner as in Example 1.

Comparative Example 1

Particles of lithium hydroxide and particles of nickel-cobalt-aluminum composite hydroxide were synthesized by publicly known methods. These particles were mixed with a ball mill to provide a raw material mixture in powder form. The raw material mixture was subjected to sinter in the air atmosphere at 800° C. to provide particles of lithium-nickel composite oxide. The particles of lithium-nickel composite oxide were used to manufacture a coin-type battery in the same manner as in Example 1.

Evaluation of Batteries

Figure 4:
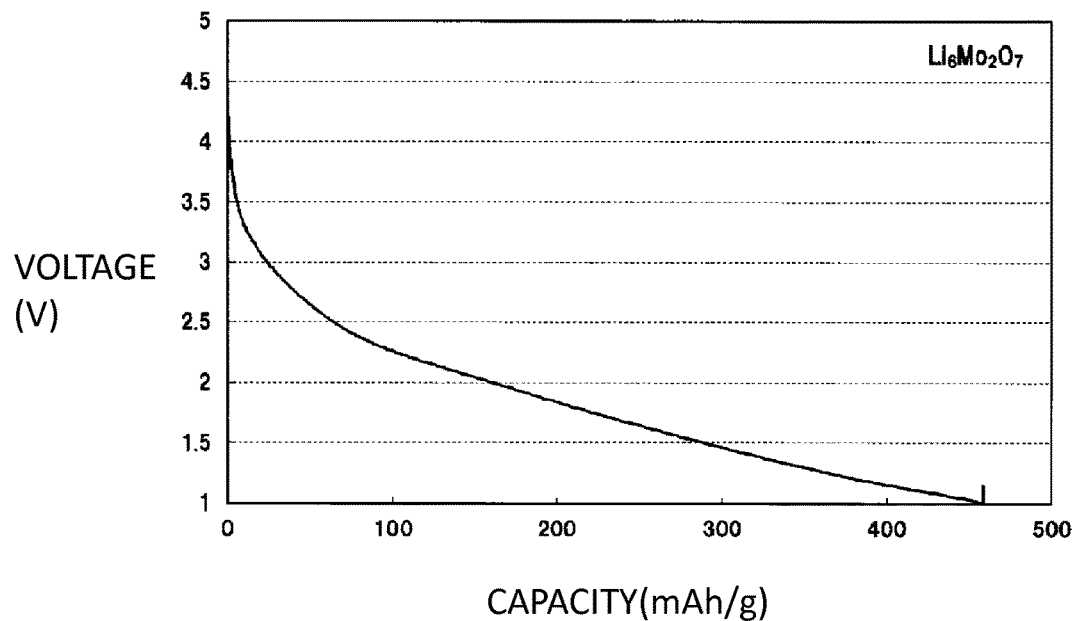
FIG. 4 illustrates an initial discharge curve of $Li_6Mo_2O_7$.
Figure 5:
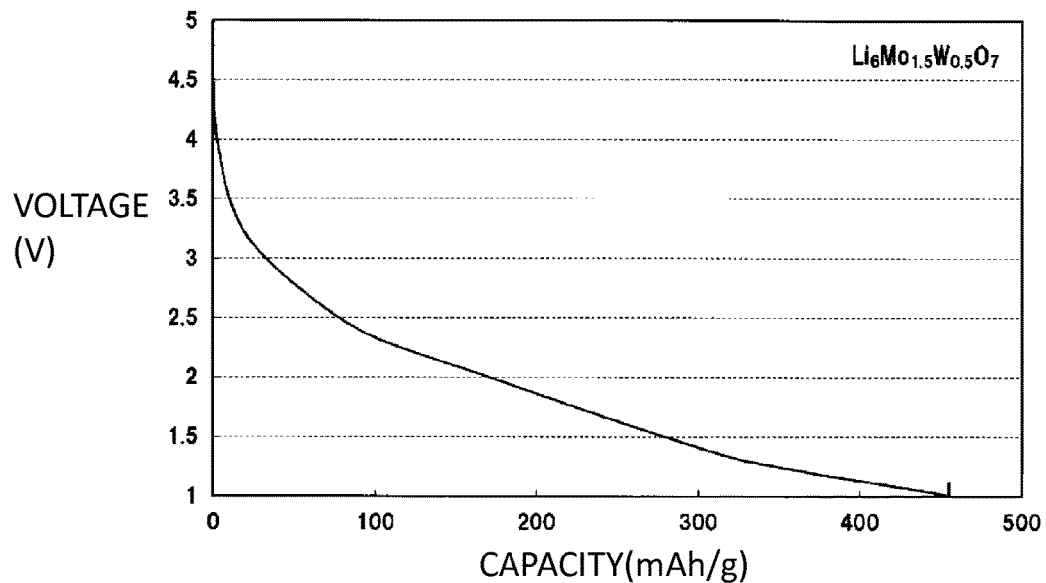
FIG. 5 illustrates an initial discharge curve of $Li_6Mo_{1.5}W_{0.5}O_7$.
Figure 7:
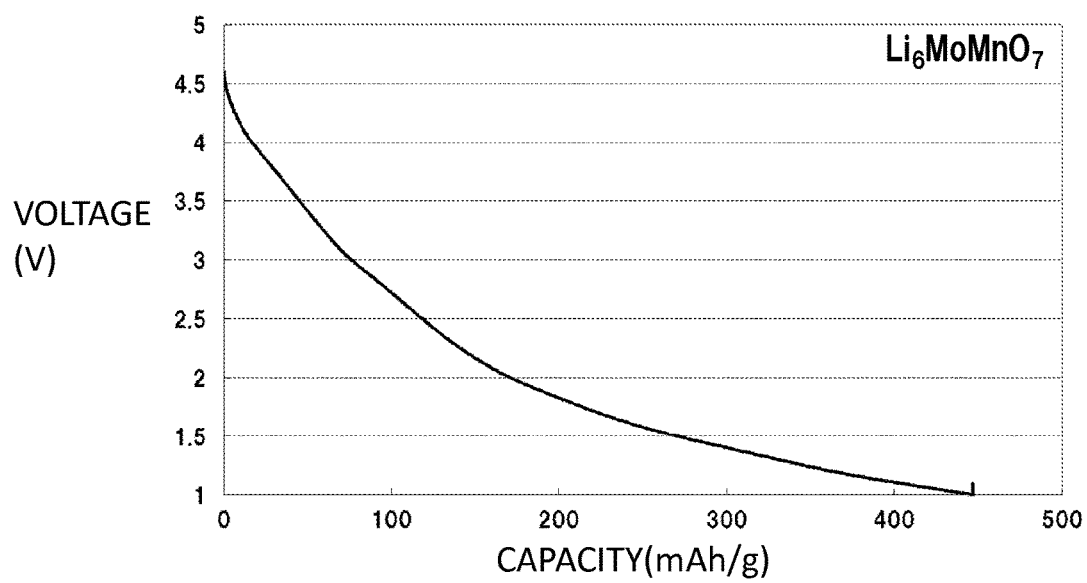
FIG. 7 illustrates an initial discharge curve of $Li_6MoMnO_7$.

FIG. 4 illustrates an initial discharge curve of $Li_6Mo_2O_7$. FIG. 5 illustrates an initial discharge curve of $Li_6Mo_{1.5}W_{0.5}O_7$. FIG. 7 illustrates an initial discharge curve of $Li_6MoMnO_7$.

The evaluation was performed as follows. The battery in Example 1 was charged until the voltage reached 4.8 V while the current density in the positive electrode was set to 0.005 $mA/cm^2$. After that, the battery in Example 1 was discharged at a current density of 0.005 $mA/cm^2$ to the end-of-discharge voltage that was set to 1.0 V. As illustrated in FIG. 4, the initial discharge capacity of the battery in Example 1 was 450 mAh/g. This evaluation method was also used to measure the initial discharge capacity of the battery in Example 2. As illustrated in FIG. 5, the initial discharge capacity of the battery in Example 2 was 450 mAh/g.

The evaluation method for Examples 1 and 2 was also used to measure the initial discharge capacity of the battery in Example 3. As a result, as illustrated in FIG. 7, the initial discharge capacity of the battery in Example 3 was 450 mAh/g.

Regarding Comparative example 1, the battery in Comparative example 1 was charged until the voltage reached 4.5 V while the current density in the positive electrode was set to 0.005 $mA/cm^2$. After that, the battery in Comparative example 1 was discharged at a current density of 0.005 $mA/cm^2$ to the end-of-discharge voltage that was set to 2.5 V. The initial discharge capacity of the battery in Comparative example 1 was 210 mAh/g.

As described above, the batteries of Examples 1, 2, and 3 had a high initial discharge capacity. This was probably achieved by participation of plural electrons in charge/discharge. The initial discharge capacity (450 mAh/g) of the batteries of Examples 1, 2, and 3 corresponds to a three-electron reaction. Accordingly, during the initial charge, lithium was probably occluded at the 8a site that was vacant prior to the charge.

In Examples 2 and 3, plural samples were prepared. As a result, the molar ratio of Li to M (Li/M) varied within the same range as in Example 1. All the active material particles belonged to space group Fd3-m. Even in the case where β and γ varied as in Example 1, the active material particles belonged to space group Fd3-m. That is, the positive electrode active materials of these Examples probably contain $Li_\alpha M_\beta O_\gamma$ (2.7≤α/β≤3.3, 1.8≤β≤2.2, 6.4≤γ≤7.6).

In Example 3, a compound in which Mo is partially substituted by Mn and W was described. However, the elements used in the substitution are not limited to Mn and W. For example, Mo may be partially substituted by at least one element of Co and Ni. For the purpose of at least partially substituting Mo by Co, CoO or $CoMoO_4$ may be used as a raw material. For the purpose of at least partially substituting Mo by Ni, NiO or $NiMoO_4$ may be used as a raw material. For the purpose of at least partially substituting Mo by V, $VO_2$ may be used as a raw material.

Stated another way, the positive electrode active material contains, as a main component, a lithium-containing transition metal compound that belongs to space group Fd3-m and that contains lithium and transition metal M (M represents Mo, or Mo and at least one selected from the group consisting of Mn, Co, Ni, W, and V) such that a molar ratio of the lithium to the transition metal M is 2.7 or more and 3.3 or less. In the case where the positive electrode active material is represented by $Li_\alpha M_\beta O_\gamma$ (2.7β≤α≤3.3β, 1.8≤β≤2.2, 6.4≤γ≤7.6), the type of transition metal M is the same as described above and the positive electrode active material may be $Li_\alpha Mo_{\beta-x} Me_x O_\gamma$ (0<x<2 or 0.1≤x≤1.5; Me represents at least one selected from the group consisting of Mn, Co, Ni, W, and V).

In Example 3, $MnMoO_4$ sintered compact was used as a manganese source. The manganese source may also be appropriately selected from transition metal oxides such as MnO, $Mn_2O_3$, and $MnO_2$. Similarly, although $WO_3$ was used for particles of tungsten oxide in Example 2, the tungsten source may be $WO_2$ or the like. By adding two or more transition metal oxides or plural composite transition metal oxides to the raw material mixture, Mo can be substituted by two or more metal elements other than Mo.

By adjusting the amount of Mn, Co, Ni, W, or V transition metal oxides or composite transition metal oxides in the raw material mixture, the amount of Mo substituted by Mn, Co, Ni, W, or V can be changed.

Lithium ion secondary batteries according to the present disclosure are useful as power sources for mobile electronic devices such as cellular phones, PDAs, personal computers, digital cameras, and portable game machines. Lithium ion secondary batteries according to the present disclosure are also useful as power sources for driving vehicles such as electric vehicles and hybrid vehicles.

What is claimed is:
1. A lithium ion secondary battery comprising:
   a positive electrode containing one or more positive electrode active materials;
   a negative electrode;
   a separator disposed between the positive electrode and the negative electrode; and a non-aqueous electrolyte,
wherein the one or more positive electrode active materials include a lithium-containing transition metal compound that contains lithium and transition metal M, where M represents Mo, or Mo and at least one selected from the group consisting of Mn, Co, Ni, W, and V, a crystal structure of the lithium-containing transition metal compound belonging to space group Fd3-m,
a molar ratio of the lithium to the transition metal M in the lithium-containing transition metal compound is 2.7 or more and 3.3 or less, and
a ratio of a mass of the lithium-containing transition metal compound to a total mass of the one or more positive electrode active materials in the positive electrode is 0.8 or more.

2. The lithium ion secondary battery according to claim 1, wherein the lithium-containing transition metal compound is $Li_\alpha M_\beta O_\gamma$, where $2.7\beta \leq \alpha \leq 3.3\beta$, $1.8 \leq \beta \leq 2.2$, $6.4 \leq \gamma \leq 7.6$.

3. The lithium ion secondary battery according to claim 1, wherein the lithium-containing transition metal compound is $Li_6M_2O_7$.

4. The lithium ion secondary battery according to claim 2, wherein the lithium-containing transition metal compound is $Li_\alpha Mo_{\beta-x} Me_x O_\gamma$, where $0 \leq x \leq 1.5$, Me represents at least one selected from the group consisting of Mn, Co, Ni, W, and V.

5. The lithium ion secondary battery according to claim 4, wherein the lithium-containing transition metal compound is $Li_6Mo_{2-x}Me_xO_7$, where $0 \leq x \leq 1.5$.

6. The lithium ion secondary battery according to claim 2, wherein the positive electrode contains a plurality of positive electrode active materials.

7. The lithium ion secondary battery according to claim 6, wherein the plurality of positive electrode active materials further include at least one additional lithium-containing transition metal compound which can insert therein and release therefrom lithium ions reversibly.

8. The lithium ion secondary battery according to claim 7, wherein the at least one additional lithium-containing transition metal compound is at least one selected from the group consisting of $Li_2MeO_3$, $LiMeO_2$, $Li_4MeO_5$, $Li_2MeO_4$, and $LiMe_2O_4$, where Me represents at least one selected from the group consisting of Mo, Mn, Co, Ni, Fe, W, Cr, and V.

9. The lithium ion secondary battery according to claim 1, wherein the lithium-containing transition metal compound maintains the crystal structure belonging to space group Fd3-m after charge and discharge.

10. The lithium ion secondary battery according to claim 1, wherein the non-aqueous electrolyte contains at least one fluorine solvent selected from the group consisting of fluoroethylene carbonate, methyl fluoropropionate, fluorobenzene, fluoroethyl methyl carbonate, and fluorodimethylene carbonate.

11. A method for manufacturing a lithium ion secondary battery, the method comprising:
preparing a positive electrode, a negative electrode containing lithium, and a separator; and
assembling the positive electrode, the separator, and the negative electrode such that the separator is disposed between the positive electrode and the negative electrode,
wherein the positive electrode contains, as a positive electrode active material, a lithium-containing transition metal compound that belongs to space group Fd3-m and that contains lithium and transition metal M (M represents Mo, or Mo and at least one selected from the group consisting of Mn, Co, Ni, W, and V),
a molar ratio of the lithium to the transition metal M is 2.7 or more and 3.3 or less,
a ratio of a mass of the lithium-containing transition metal compound to a total positive-electrode-active-material mass in the positive electrode is 0.8 or more.

12. The method according to claim 11, wherein the lithium-containing transition metal compound is $Li_\alpha M_\beta O_\gamma$ ($2.7\beta \leq \alpha \leq 3.3\beta$, $1.8 \leq \beta \leq 2.2$, $6.4 \leq \gamma \leq 7.6$).

13. The method according to claim 11, wherein the lithium-containing transition metal compound is $Li_6M_2O_7$.

14. The method according to claim 12, wherein the lithium-containing transition metal compound is $Li_\alpha Mo_{\beta-x}Me_xO_\gamma$ ($0 \leq x \leq 1.5$, Me represents at least one selected from the group consisting of Mn, Co, Ni, W, and V).

15. The method according to claim 14, wherein the positive electrode active material is $Li_6Mo_{2-x}Me_xO_7$ ($0 \leq x \leq 1.5$).

16. The lithium ion secondary battery according to claim 1, wherein the one or more positive electrode active materials contain substantially only the lithium-containing transition metal compound.

17. The lithium ion secondary battery according to claim 1, wherein the lithium-containing transition metal compound exists as a plurality of particles.

18. The lithium ion secondary battery according to claim 17, wherein an average value of primary particles of the lithium-containing transition metal compound is within a range of 50 nm to 500 nm.

19. The lithium ion secondary battery according to claim 17, wherein the positive electrode further contains a conductive agent that partially covering surfaces of the plurality of particles.

* * * * *